(12) United States Patent
Ogawa et al.

(10) Patent No.: US 7,234,563 B2
(45) Date of Patent: Jun. 26, 2007

(54) STEER-BY-WIRE SYSTEM AND CONTROL PROGRAM THEREFOR

(75) Inventors: Shoji Ogawa, Chiryu (JP); Yoshiyuki Shibata, Toyota (JP); Toshihiro Takahashi, Nishio (JP)

(73) Assignee: JTEKT Corporation, Osaka (JP)

( * ) Notice: Subject to any disclaimer, the term of this patent is extended or adjusted under 35 U.S.C. 154(b) by 270 days.

(21) Appl. No.: 10/814,247

(22) Filed: Apr. 1, 2004

(65) Prior Publication Data

US 2004/0211618 A1 Oct. 28, 2004

(30) Foreign Application Priority Data

Apr. 22, 2003 (JP) .............................. 2003-116784

(51) Int. Cl.
*B62D 5/04* (2006.01)
(52) U.S. Cl. .................. 180/402; 180/446; 701/41
(58) Field of Classification Search ................ 180/402, 180/403, 446; 701/41–43
See application file for complete search history.

(56) References Cited

U.S. PATENT DOCUMENTS

| | | | |
|---|---|---|---|
| 4,977,507 A * | 12/1990 | Matsuoka et al. | 701/43 |
| 5,347,458 A * | 9/1994 | Serizawa et al. | 701/41 |
| 5,908,457 A * | 6/1999 | Higashira et al. | 701/41 |
| 6,059,068 A * | 5/2000 | Kato et al. | 180/402 |
| 6,219,604 B1 * | 4/2001 | Dilger et al. | 701/41 |
| 6,913,109 B2 * | 7/2005 | Kodama et al. | 180/446 |
| 2004/0098180 A1 * | 5/2004 | Von Hammel et al. | 701/41 |
| 2004/0199315 A1 * | 10/2004 | Altemare et al. | 701/41 |

FOREIGN PATENT DOCUMENTS

| | | |
|---|---|---|
| JP | 5-1656 | 1/1993 |
| JP | 10-310074 | 11/1998 |
| JP | 2000-43737 | 2/2000 |
| JP | 2002-37112 | 2/2002 |
| JP | 2003-2223 | 1/2003 |

* cited by examiner

*Primary Examiner*—Anne Marie Boehler
(74) *Attorney, Agent, or Firm*—Oblon, Spivak, McClelland, Maier & Neustadt, P.C.

(57) ABSTRACT

Disclosed is a steer-by-wire system and a control program therefor which are capable of preventing a steering handle from being turned excessively. According to the steer-by-wire system and the control program, when drive electric current to a steering actuator is restrained to restrict the steering of steerable road wheels, the steering reaction force to the steering handle is increased thereby to make the steering handle hard or unable to turn further. Thus, the steering handle can be prevented from being turned excessively. Further, when the steering actuator is heated beyond a predetermined temperature, such is judged as the overload on the steering actuator thereby to restrain the drive electric current to the steering actuator. Therefore, it can be obviated that the steering actuator is overheated to suffer failure.

4 Claims, 3 Drawing Sheets

STEER-BY-WIRE SYSTEM AND CONTROL PROGRAM THEREFOR

INCORPORATION BY REFERENCE

This application is based on and claims priority under 35 U.S.C. sctn. 119 with respect to Japanese Application No. 2003-116784 filed on Apr. 22, 2003, the entire content of which is incorporated herein by reference.

BACKGROUND OF THE INVENTION

1. Field of the Invention

The present invention relates to a steer-by-wire system and a control program therefor suitable for use in motor vehicles.

2. Discussion of the Related Art

Generally, in a steer-by-wire system for a motor vehicle, as described in Japanese unexampled, published patent application No. 2002-37112 for example, a steering handle and steerable road wheels are mechanically disconnected, and a steering actuator steers the steerable road wheels in dependence on the steering angle of the steering handle, while a reaction force generating actuator applies a steering reaction force to the steering handle. Further, there has been under development a steer-by-wire system which is capable of controlling a reaction force generating actuator to generate a steering reaction force in proportion to a drive electric current to a steering actuator.

By the way, in the steer-by-wire system under development, when the steerable road wheels are brought into state in which they are unable to steer anymore, the steering actuator comes to be overloaded, and therefore, the drive electric current to the steering actuator is restrained to avoid the overheating of the same.

However, in the steer-by-wire system under development, the steering reaction force is controlled to be decreased as the drive electric current to the steering actuator is limited or restrained, and it occurs therefore that the vehicle driver turns the steering handle excessively even in the state that the steerable road wheels are unable to steer further.

SUMMARY OF THE INVENTION

Accordingly, in view of the foregoing drawback, it is a primary object of the present invention to provide an improved steer-by-wire system and an improved control program therefor which are capable of preventing a steering handle from being turned excessively.

Briefly, according to the present invention, there is provided a steer-by-wire system having a steering handle disconnected mechanically from steerable road wheels, a steering actuator for steering the steerable road wheels in dependence on the steering angle of the steering handle, and a reaction force generating actuator for applying steering reaction force to the steering handle. The steer-by-wire system also includes reaction force control means for controllably driving the reaction force generating actuator, and drive electric current restraining means for restraining the drive electric current to the steering actuator while the same is in the sate of being overloaded. The reaction force control means drives the reaction force generating actuator so that in an ordinary state, the steering reaction force is controlled to correspond to the drive electric current applied to the steering actuator and so that while the drive electric current restraining means restrains the drive electric current to the steering actuator, the steering reaction force is controlled to be increased larger than that in the ordinary state.

With this configuration, in the ordinary state, the reaction force generating actuator is driven to make the steering reaction force correspond to the drive electric current to the steering actuator. However, while the drive electric current to the steering actuator is restrained, the reaction force generating actuator is driven to increase the steering reaction force thereby to make the steering handle hard to turn, so that the same can be prevented from being turned excessively.

In another aspect of the present invention, there is provided a control program for a steer-by-wire system having a steering handle disconnected mechanically from steerable road wheels, a steering actuator for steering the steerable road wheels in dependence on the steering angle of the steering handle, a reaction force generating actuator for applying steering reaction force to the steering handle, reaction force control means for controllably driving the reaction force generating actuator, and drive electric current restraining means for restraining the drive electric current to the steering actuator while the same is in the sate of being overloaded. The control program comprises a step of detecting whether or not the drive electric current restraining means restrains the drive electric current to the steering actuator, a step of driving the reaction force generating actuator so that the steering reaction force is controlled to correspond to the drive electric current to the steering actuator while the drive electric current restraining means does not restrain the drive electric current to the steering actuator. The control program further comprises a step of driving the reaction force generating actuator so that the steering reaction force is controlled to be increased while the drive electric current restraining means restrains the drive electric current to the steering actuator, and a step of making the ratio of the steering angle of the steerable road wheels to the steering angle of the steering handle smaller than that in the ordinary state while the drive electric current restraining means restrains the drive electric current to the steering actuator.

According to the control program of this configuration, while the drive electric current to the steering actuator is restrained, the steering reaction force is increased to make the steering handle hard to turn further. Thus, the steering handle can be prevented from being steered excessively as is the case of the prior art system. Further, while the drive electric current to the steering actuator is restrained, the ratio of the steering angle of the steerable road wheels to the steering angle of the steering handle is made smaller than that in the ordinary state. Therefore, the steering handle becomes hard to turn further, from the fact of which the vehicle driver can be notified that the drive electric current to the steering actuator is restrained.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
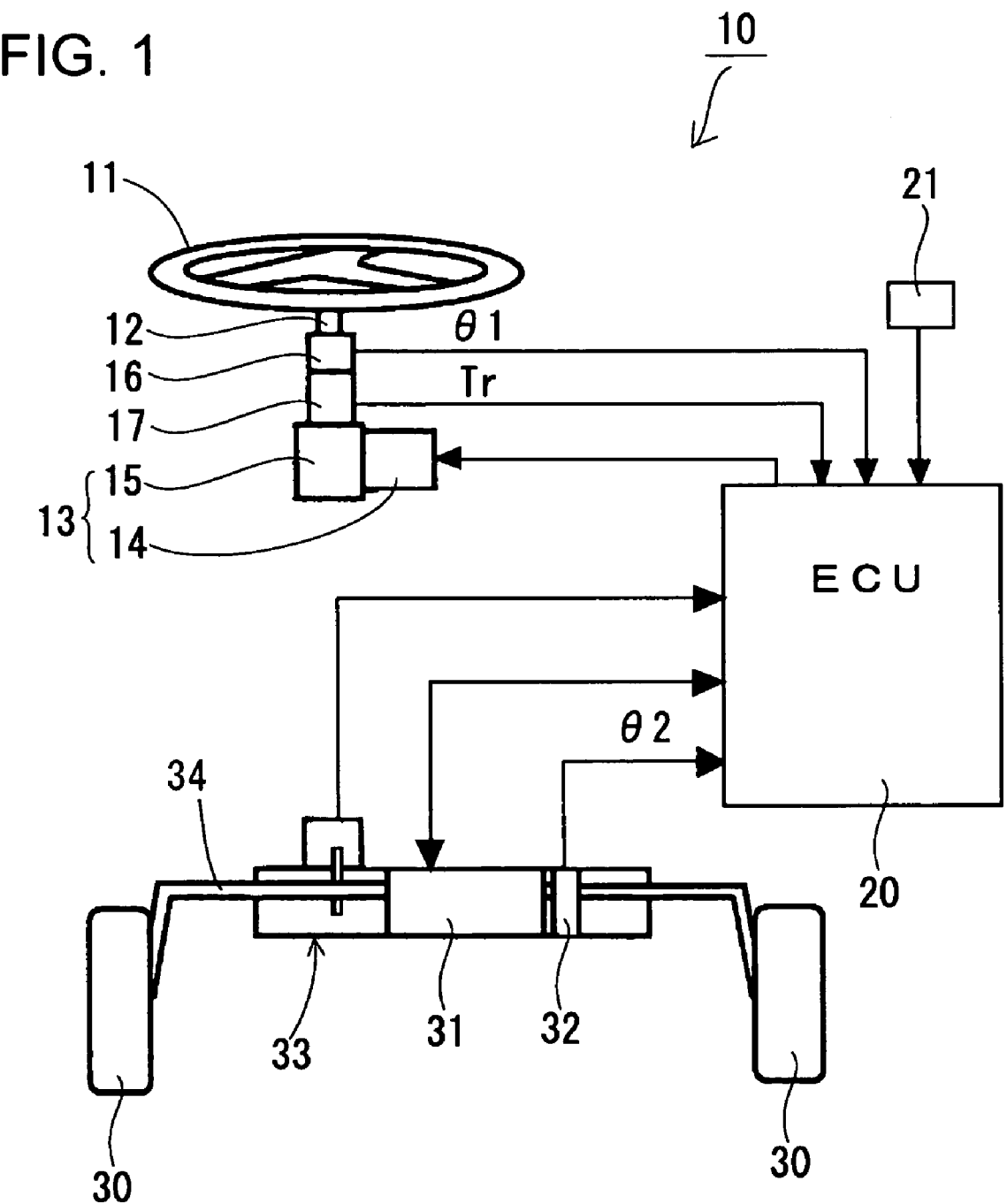
FIG. 1 is a schematic block diagram showing the general construction of a steer-by-wire system in one embodiment according to the present invention.
Figure 2:
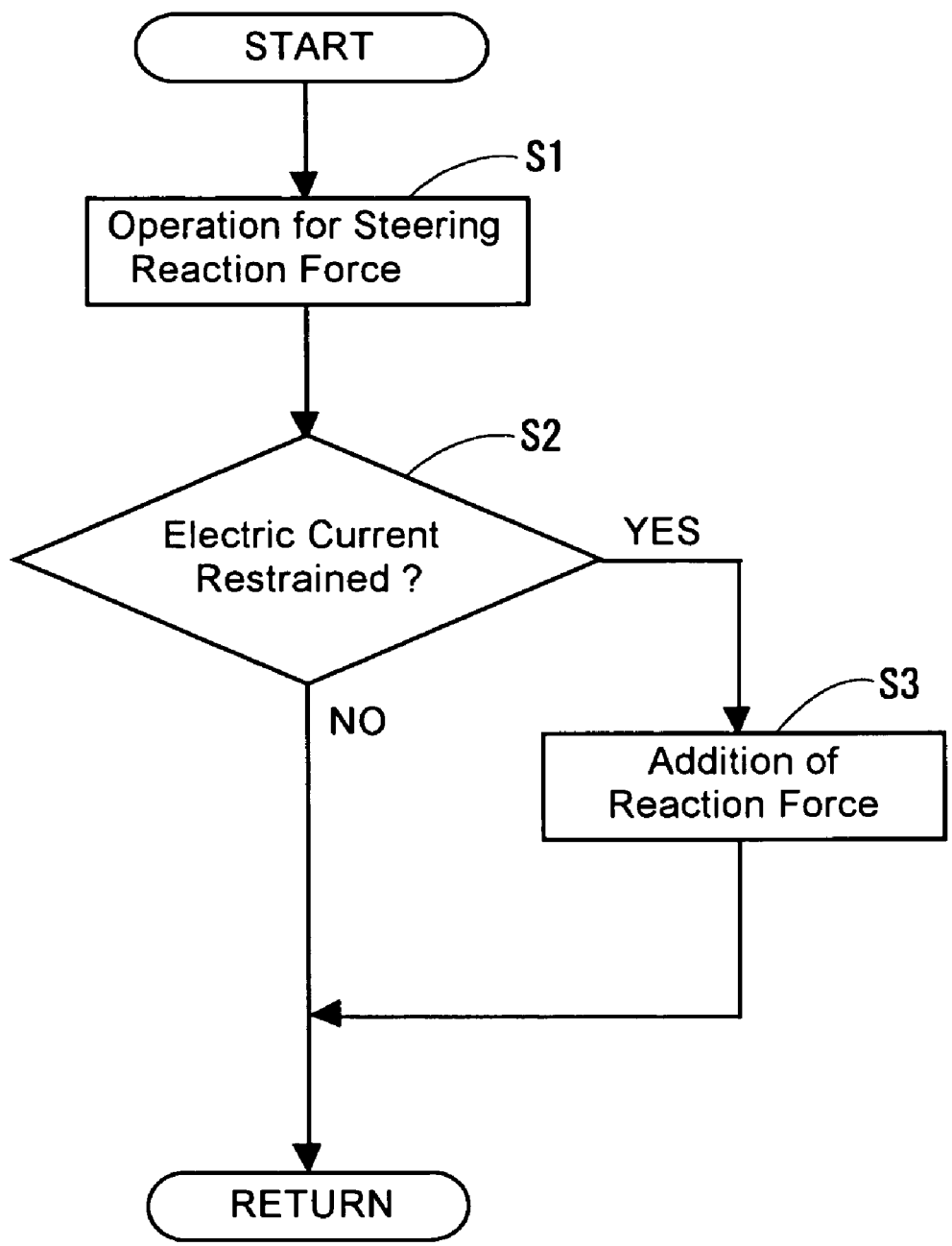
FIG. 2 is a flow chart of a control program for the steer-by-wire system.
Figure 3:
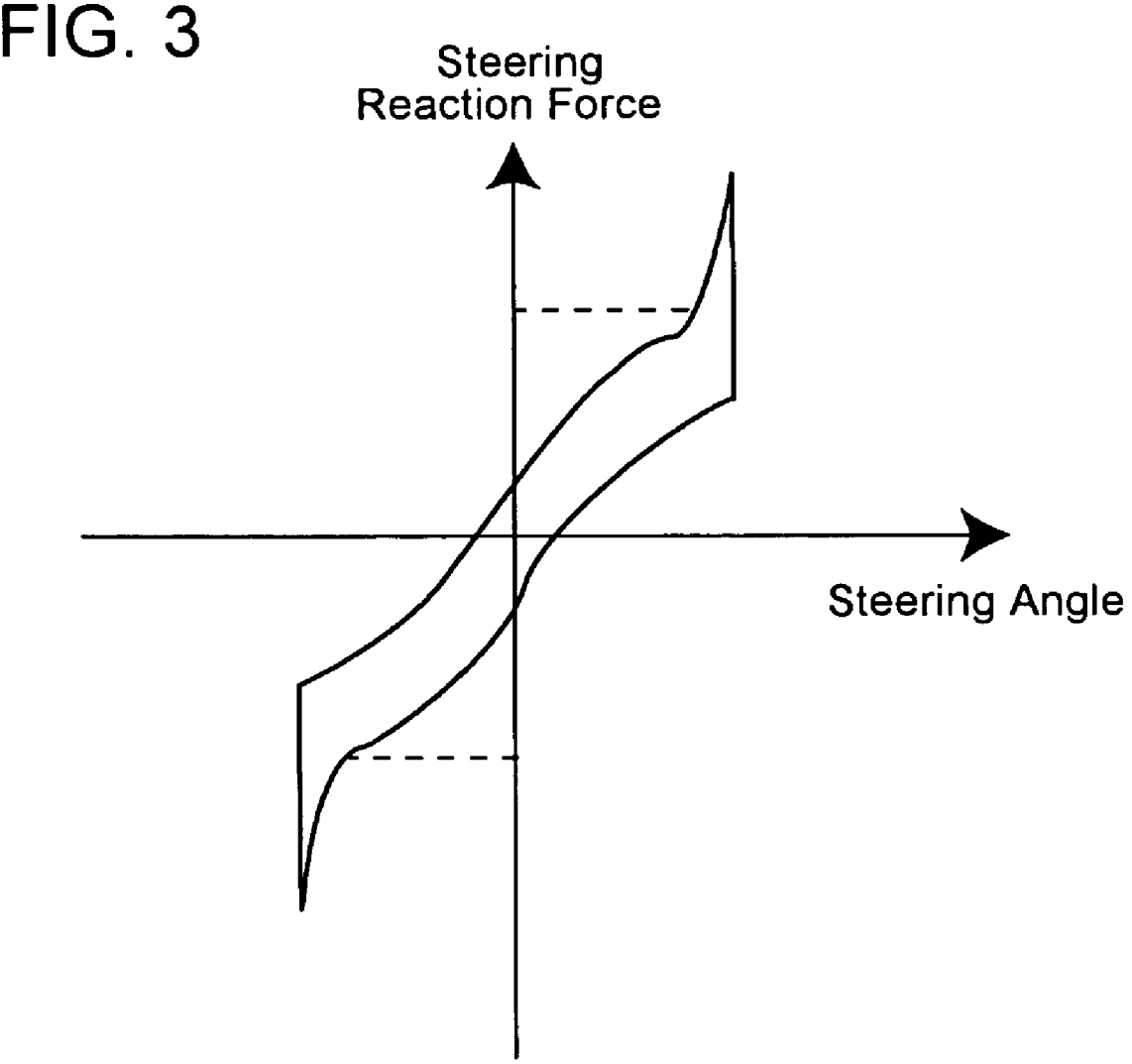
FIG. 3 is a graph showing the relationship between the angle of a steering handle and the reaction torque applied thereto.

An embodiment according to the present invention will be described hereafter with reference to FIGS. 1 to 3. FIG. 1 shows the general construction of a steer-by-wire system 10 in one embodiment according to the present invention. In this steer-by-wire system 10, a steering handle 11 is mechanically disconnected from steerable road wheels 30 (usually, front wheels of a vehicle), and a reaction force generating actuator 13 is connected to an end of a steering shaft 12 extending from the center of the steering handle 11. The reaction force generating actuator 13 is composed of an electric motor 14 and a worm gear mechanism 15. The motor 14 is arranged with its rotational shaft extending perpendicular to the steering shaft 12, and the worm gear mechanism 15 is constituted as of the type that a worm shaft (not shown) secured on the rotational shaft of the electric motor 14 is in meshing engagement with a worm wheel (not shown) secured on the steering shaft 12.

On the intermediate portion of the steering shaft 12, there are provided a handle angle sensor 16 for detecting the steering angle ($\theta$1) of the steering handle 11 and a torque sensor 17 for detecting a load torque exerted on the steering shaft 12, that is, the steering reaction force against the manipulation of the steering handle 11.

Between the right and left steerable road wheels 30, 30, there is provided a steering actuator 33, which is constituted by a ball screw mechanism incorporating an electric motor 31 therein. The ball screw mechanism is able to rotate a ball screw nut (not shown) by the electric motor 31, so that a ball screw shaft 34 is linearly moved right and left of a vehicle body (not shown) mounting the steer-by-wire system 10 thereon. The steerable road wheels 30, 30 are connected to the opposite ends of the ball screw shaft 34 and are able to be steered upon operation of the steering actuator 33. Further, the steering actuator 33 incorporates therein a wheel angle sensor 32 for detecting the steering angle ($\theta$2) of the steerable road wheels 30, 30.

Also in FIG. 1, a numeral 20 denotes an ECU (Electronic Control Unit), which takes therein detection signals from the handle angle sensor 16, the wheel angle sensor 32, the torque sensor 17, a vehicle speed sensor 21 and the like. The ECU 20 determines a gear ratio (R=$\theta$2/$\theta$1) of the wheel steering angle ($\theta$2) to the handle steering angle ($\theta$1) in dependence upon the driving status such as for example vehicle speed or the like. Further, the ECU 20 determines a target wheel angle from, e.g., the product ($\theta$1·R) of the handle steering angle ($\theta$1) of the steering handle 11 and the gear ratio (R) and applies a drive electric current to the steering actuator 33 (to be exact, to the electric motor 31) so that the steerable load wheels 30, 30 are steered to be oriented at the target wheel angle.

Further, the ECU 20 takes therein the temperature of the steering actuator 33 as a detection signal from a temperature sensor (not shown). The ECU 20 judges that the steering actuator 33 is in the state of being overloaded while the temperature of the steering actuator 33 exceeds a predetermined value. When so judging, the ECU 20 restrains the drive electric current to the steering actuator 33.

Further, the ECU 20 drives the reaction force generating actuator 13 in such a way that the steering resistance of the steerable road wheels 30 depending on the state of the road surface can be reflected on the steering reaction force acting on the steering handle 11. To this end, the ECU 20 executes a control program PG1 shown in FIG. 2 at a predetermined time interval. Thus, at step S1, the steering reaction force to be exerted on the steering handle 11 is determined by, e.g., the product of the drive electric current to the steering actuator 33 and the gear ratio (R). Then, it is checked at step S2 whether or not the drive electric current to the steering actuator 33 has been limited or restrained. When the answer is NO, that is, when the drive electric current to the steering actuator 33 has not been restrained, the ECU 20 goes out of this control program PG1. When the answer at step S2 is YES because the drive electric current to the steering actuator 33 has been restrained, the steering reaction force is increased at step S3 by adding a predetermined additional force to the steering reaction force determined at step S1 before the ECU 20 goes out of this control program PG1. After going out of the control program PG1, the ECU 20 applies to the electric motor 14 of the reaction force generating actuator 13 such a drive electric current that the reaction force generating actuator 13 is enabled to generate the steering reaction force determined by the control program PG1. The aforementioned operation steps are repetitively executed at the predetermined time interval.

(Operation)

The operation of the steer-by-wire system 10 as constructed above in the embodiment will be described hereinafter. In the steer-by-wire system 10, in an ordinary state, the steering handle 11 is given the steering reaction force which corresponds to the product of the drive electric current to the steering actuator 33 and the gear ratio (R). Thus, the driver is able to turn the steering handle 11 while feeling the steering resistances against the steerable road wheels 30, 30 just like the construction of the type that the steering handle 11 is mechanically connected with the steerable road wheels 30, 30.

Further, the gear ratio (R) is altered in dependence upon the driving state, and the steering reaction force is determined based on the product of the altered gear ratio (R) and the drive electric current to the electric motor 31 of the steering actuator 33. Thus, the driver is given the steering feeling depending on the driving state. In concrete, during high speed driving, the gear ratio (R) is made smaller, so that the steerable road wheels 30 cannot be steered sharply upon turning of the steering handle 11. During low speed driving, on the other hand, the gear ratio (R) is made larger, so that the steerable road wheels 30 can be steered sharply upon turning of the steering handle 11.

When the steering handle 11 is turned close to either end of the steering stroke, as is often the case that it is turned with the vehicle stopped, the load on the steering actuator 33 increases to raise the temperature of the same. As the temperature of the steering actuator 33 increases beyond the predetermined value, it is judged that the steering actuator 33 is in the state of being overloaded, and the consequence is that the drive electric current applied to the steering actuator 33 is restrained. Then, in the condition of the drive electric current being restrained, the drive electric current to the reaction force generating actuator 13 (i.e., to the electric motor 14) is increased thereby to augment the steering reaction force. That is, as shown by the graph in FIG. 3, when the steering angle of the steering handle 11 reaches the end thereof, the steering handle 11 becomes hard to turn further, that is, it comes to be prevented from being turned in a direction to further enlarge the steering angle of the steerable road wheels 30, 30.

Although foregoing embodiment is directed to the example wherein the steering reaction force against the steering handle 11 is increased when the same is turned close to either end of the steering stroke, the same control operation is performed when the drive electric current to the steering actuator 33 is restrained in the event that either of the steerable wheels 30, 30 hits on curbstone thereby to increase the load on the steering actuator 33.

As described earlier, according to the steer-by-wire system 10 and the control program PG1 therefor in the embodiment, when the drive electric current to the steering actuator 33 is restrained thereby to prevent the steerable road wheels 30, 30 from being steered, the steering reaction force against the steering handle 11 is also increased thereby to make the steering handle 11 hard or unable to turn further. Thus, it becomes possible to prevent the steering handle 11 from being turned excessively. Further, when heated beyond the predetermined temperature, the steering actuator 33 is detected as being overloaded. In this event, the drive electric current to the steering actuator 33 is restrained, so that the same can be freed from suffering the failure caused by overheating.

Furthermore, the foregoing embodiment may be modified to take such a construction that the gear ratio (R) is made smaller under the condition that for example, the ECU 20 has restrained the drive electric current applied to the steering actuator 33. With this modified embodiment, switching is effected to the state in which the steerable road wheels 30, 30 become to be hardly steered against the turning of the steering handle 11, so that the driver can be notified that the steering actuator 33 is in the state of being overloaded.

Finally, various features and many of the attendant advantages in the foregoing embodiment will be summarized as follows:

In one aspect of the forgoing embodiment, in the ordinary state, the reaction force generating actuator 13 is driven to make the steering reaction force correspond to the drive electric current to the steering actuator 33. However, while the drive electric current to the steering actuator 33 is restrained, the reaction force generating actuator 13 is driven to increase the steering reaction force thereby to make the steering handle 11 hard or unable to turn further, so that the same can be prevented from being turned excessively.

In another aspect of the forgoing embodiment, the overload on the steering actuator 33 is detected when the same is heated beyond the predetermined temperature. The drive electric current to the steering actuator 33 is restrained during the overload thereon. Therefore, the steering actuator 33 can be prevented from being overheated and hence, from suffering failure.

In a further aspect of the forgoing embodiment, when the drive electric current to the steering actuator 33 is restrained, the ratio (R=θ2/θ1) of the steering angle (θ2) of the steerable road wheels 30 to the steering angle (θ1) of the steering handle 11 is made smaller than that in the ordinary state. Thus, the steerable road wheels 30 become hard to steer, from the fact of which the vehicle driver can be notified of the change of state.

In a still further aspect of the foregoing embodiment, while the drive electric current to the steering actuator 33 is restrained, the steering reaction force is increased to make the steering handle 11 hard to turn further. Thus, the steering handle 11 can be prevented from being turned excessively as is the case of the prior art system. Further, while the drive electric current to the steering actuator 33 is restrained, the ratio (R=θ2/θ1) of the steering angle (θ2) of the steerable road wheels 30 to the steering angle (θ1) of the steering handle 11 is made smaller than that in the ordinary state. Therefore, the steering handle 11 becomes hard or unable to steer, from the fact of which the vehicle driver can be notified that the drive electric current to the steering actuator 33 has been restrained.

Obviously, numerous modifications and variations of the present invention are possible in light of the above teachings. It is therefore to be understood that within the scope of the appended claims, the present invention may be practiced otherwise than as specifically described herein.

What is claimed is:

1. A steer-by-wire system comprising:
    a steering handle disconnected mechanically from steerable road wheels;
    a steering actuator responsive to a drive electric current related to a steering angle of said steering handle, and mechanically connected to said steerable road wheels for steering said steerable road wheels in dependence on the steering angle of said steering handle;
    reaction force generating means for applying steering reaction force to said steering handle;
    reaction force control means for controllably driving said reaction force generating means; and
    drive electric current restraining means for restraining the drive electric current to said steering actuator while the steering actuator is in a state of being overloaded;
    wherein said reaction force control means drives said reaction force generating means so the steering reaction force is controlled to correspond to the drive electric current applied to the steering actuator while the drive electric current restraining means does not restrain the drive electric current to said steering actuator, and so that while said drive electric current restraining means restrains the drive electric current to said steering actuator, the steering reaction force is increased to be larger than that corresponding to the drive electric current applied to the steering actuator when the drive electric current restraining means does not restrain the drive electric current to said steering actuator.

2. The steer-by-wire system as set forth in claim 1, wherein said drive electric current restraining means restrains the drive electric current to said steering actuator while the steering actuator is overloaded as a result of being heated beyond a predetermined temperature.

3. The steer-by-wire system as set forth in claim 1, further comprising:
    state notification means for notifying a vehicle driver of the change of state by making the ratio of the steering angle of said steerable road wheels to the steering angle of said steering handle smaller, while said drive electric current restraining means restrains the drive electric current to said steering actuator, than while the drive electric current restraining means does not restrain the drive electric current to said steering actuator.

4. A control method for a steer-by-wire system having a steering handle disconnected mechanically from steerable road wheels; a steering actuator responsive to a drive electric current related to a steering angle of said steering handle, and mechanically connected to said steerable road wheels for steering said steerable road wheels in dependence on the steering angle of said steering handle; a reaction force generating actuator for applying steering reaction force to said steering handle; reaction force control means for controllably driving said reaction force generating actuator; and drive electric current restraining means for restraining the drive electric current to said steering actuator while the steering actuator is in a state of being overloaded; said control program comprising the steps of:

detecting whether or not said drive electric current restraining means restrains the drive electric current to said steering actuator;

driving said reaction force generating actuator so that said steering reaction force is controlled to correspond to the drive electric current to said steering actuator while said drive electric current restraining means does not restrain the drive electric current to said steering actuator;

driving said reaction force generating actuator so that said steering reaction force is controlled to be increased to be larger than that corresponding to the drive electric current applied to the steering actuator when the drive electric current restraining means does not restrain the drive electric current to said steering actuator, while said drive electric current restraining means restrains the drive electric current to said steering actuator; and making the ratio of the steering angle of said steerable road wheels to the steering angle of said steering wheel smaller than that when the drive electric current restraining means does not restrain the drive electric current to said steering actuator, while said drive electric current restraining means restrains the drive electric current to said steering actuator.

* * * * *